Patented May 28, 1929.

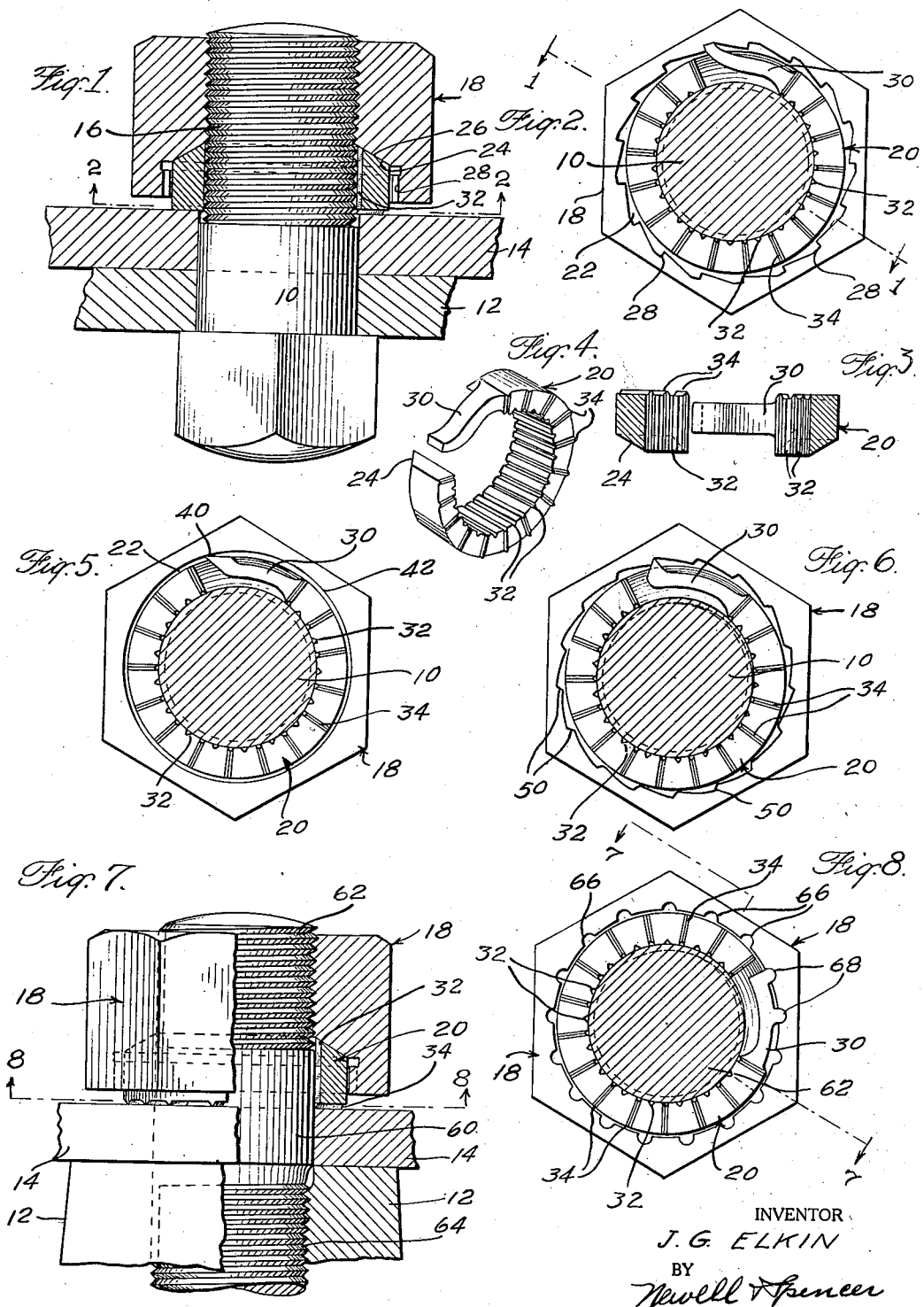

1,714,711

UNITED STATES PATENT OFFICE.

JACOB G. ELKIN, OF NEW YORK, N. Y.

NUT AND BOLT LOCKING DEVICE.

Application filed October 31, 1925. Serial No. 65,915.

The present invention relates to nut locks, and provides a device of this character which performs the dual function of locking a nut relative to a bolt with which it may have screw-threaded engagement, and locking the bolt relative to the part or parts which it secures together or by which it may be carried, and while in its present illustration, the invention is shown as used in connection with a bolt and nut between which there is a screw-threaded engagement, it is quite obvious that the invention may be effectively employed in connection with other types of coupling devices.

It is one of the objects of the invention to provide a locking means for the several elements of a coupling device such for example, as a bolt and nut, which locking means serves to effectively secure the several elements of the coupling device against movement relative to each other, and relative to the elements which the coupling device is employed to secure together or by which it is carried.

It is a further object of the invention to provide means which will effectively lock the several elements of a coupling device against accidental displacement relative to each other without injury to any of the elements of said coupling device.

To this end, the invention as herein illustrated contemplates a bolt, and a nut for securing a plurality of elements together, and a locking means, which as herein shown, comprises a resilient member interposed with respect to the nut and bolt, and with respect to the nut and one of the elements secured together in such a manner that when the nut is forced home, the resilient member will have locking engagement with the nut, the bolt, and one of the elements secured together by said bolt.

The invention will be clearly understood from the accompanying drawings illustrating the invention in its preferred forms, and the following detailed description of the construction therein shown.

In the accompanying drawings,

Fig. 1 is a longitudinal sectional view illustrating one form of the invention;

Fig. 2 is a transverse sectional view taken on the line 2—2 of Fig. 1;

Fig. 3 is a transverse sectional view taken on the line 1—1 of Fig. 2;

Fig. 4 is a perspective view of the locking elements;

Fig. 5 is a transverse sectional view of a modified form of the invention;

Fig. 6 is a transverse sectional view illustrating a still further modified form of the invention;

Fig. 7 is a longitudinal sectional view of a still further modified form of the invention; and Fig. 8 is a transverse sectional view taken on line 8—8 of Figure 7.

In that form of the invention illustrated in Figs. 1 to 6 of the drawings, a bolt 10 is passed through two elements which it is desired to secure together, which elements may for example, be two plates 12 and 14. The body portion of the bolt is provided with a screw-threaded portion 16 and for securing the two elements together, a nut 18 is threaded upon the bolt 10 in the manner common to devices of this character.

When the nut is screwed home to secure the several parts together, it is desirable that it be positively retained against accidental displacement or loosening, and to insure this action, a locking element 20 herein shown as a resilient split ring is provided.

This locking element 20 is adapted to be received in a recess 22 in the inner face of the nut 18, and has that face which engages the inner wall of the recess 22 of the nut beveled as at 24, it being understood that the said inner wall of the recess is inclined as designated by the numeral 26, the angle of the incline preferably corresponding to the angle of the bevel 24.

The side wall of the recess 22 of the nut 18 is formed with a plurality of stops 28, preferably in the form of shoulders, and for the purpose of preventing movement of the nut relative to the locking element 20 in one direction, one end of the locking element 20 is reduced to provide a finger, or the like, 30 adapted to ride over these stops 28 when the nut is rotated in one direction, as for example, when the nut is being screwed home, and to engage against the said stops 28 when an attempt is made to rotate the nut in the opposite direction to remove the same. It will be obvious that the finger 30 in passing over these stops 28 will produce a clicking sound which is instrumental in determining when the nut has been screwed home.

The bolt is prevented from turning relative to the locking element 20 by reason of the engagement with the bolt of a plurality of biting teeth 32 formed upon the inner face of the locking element 20, it being understood that the locking element is contracted about the bolt by the action of the beveled faces 24 and 26 when the nut is screwed home.

The locking element is prevented from turning relative to the elements it is desired to secure together by reason of biting teeth 34 formed on that face of the said locking element which is opposed with respect to the beveled face 24 thereof, this face being the one that is forced into engagement with one of the elements secured together by the nut and bolt when the nut is screwed home and which in the present illustration of the invention is the plate 14.

From the foregoing it will be apparent that when the nut has been screwed home, due to the engagement of the locking element 20 with the bolt and one of the elements to be secured together thereby, the bolt is secured against movement relative to said locking element and the elements secured together by the bolt, and by reason of the engagement of the finger 30 with one of the stops 28, the nut is prevented from turning relative to the bolt and locking device.

Thus it will be seen that all of the parts are effectively locked together and cannot be released without distortion of the finger 30 to the extent which will permit of its freely passing the stops 28 which condition it is only possible to bring about by exertion of excessive strain in the loosening direction on the nut 18 by means of a suitable tool.

The foregoing, however, applies only to that form of the invention disclosed in Figs. 1 to 4 inclusive, as in the modified forms of the invention, the foregoing is not literally true.

For instance, in that form of the invention set forth in Fig. 5, the stops 28 are dispensed with and the free end of the finger 30 is formed with a biting edge 40, the peripheral wall of the recess 22 of the nut being smooth, as indicated at 42. When in this illustrated form of the invention, the nut is screwed home, the biting edge 40 of the finger rides freely over the smooth peripheral wall of the recess 22, but upon attempted movement of the nut in a direction to loosen it, the edge 40 bites into the said smooth wall 42, thus preventing loosening of the nut 18. In this form of the invention, absolute distortion of the finger 30 is necesasry before the nut can be removed.

In that form of the invention illustrated in Fig. 6, the peripheral wall of the recess 22 is provided with a plurality of spaced stops 50 of a nature somewhat similar to the stops 28 in that form of the invention disclosed in Figs. 1 to 4 of the drawings. These stops 50, however, differ from the stops 28 in that they are angularly disposed with respect to the radius of nut 18 in such a manner as to permit the free end of the finger 30 to pass thereover when the nut is rotated in the direction to loosen it, it of course, being understood that to produce such actions a force sufficient to overcome the tension of the finger 30 is necessary, and that this tension of the finger 30 is sufficient to prevent such an action taking place under the influence of any shocks, jars or vibrations to which the coupling would be subjected in ordinary use.

In that form of the invention illustrated in Figs. 7 and 8, the bolt is slightly different than that disclosed in Figs. 1 to 6. The bolt or stud in this form of the invention is of the type having a body portion 60 from which two screw-threaded portions 62 and 64 project in opposite directions. In a coupling employing a bolt or stud of this character, one of the threaded ends 64 is screwed into one of the elements which it is desired to secure together, for example, the plate 12. In lieu of the bolt or stud having threaded engagement with one of the associated parts to be secured together, it will be obvious that the bolt or stud may be passed through an opening therein and a nut such as described may be screwed onto each of the screw-threaded ends of the bolt or stud with the associated parts to be secured together clamped between the nuts.

In the last mentioned form of the invention, relative movement between the locking element 20 and the nut 18 is prevented by reason of the engagement in substantially semicircular recesses 66 formed in the peripheral wall of the recess 22 of the nut, of lugs 68 formed on the finger 30 of the locking element 20 of which in the present illustration of this form of the invention there are two. Such a construction also permits of a backing off of the nut 18 since while the recesses 66 and the lugs 68 are of sufficient size to prevent their becoming accidentally disengaged they may, upon application in the direction to loosen the nut, of sufficient force to overcome the resiliency of the finger 30, be disengaged and the nut removed without injury to any of the parts of the coupling. Also the locking device prevents the bolt or stud 60 from screwing out as this stud is secured against turning with relation to the members it is desired to secure together.

By reference to the drawings it will be noted that the thickness of the locking member 20 is greater than the depth of the recess 22 in the nut in which it is received and, therefore, the nut when screwed home would in no instance engage the plate 14 or that member of the members secured together which is adjacent the nut.

Such a construction is employed for two reasons, the first being that by this construction the nut will have frictional contact only with the bevel face 24 of the locking device and, consequently, less effort will be required to screw the nut home than would be the case were the entire flat face with its numerous edges, due to its angular form, permitted to engage the plate 14, and secondly, possibility of defacing or otherwise injuring the plate 14 by a tightening of the nut is entirely removed.

From the foregoing it will be obvious that in each of the above forms of the invention, the locking element is contracted about the bolt which it surrounds for the purpose of preventing the rotation of the bolt relative to the members secured together thereby. Furthermore, rotary movement of the locking member is prevented by reason of engagement of its teeth 34 with the member with which it engages, and rotary movement of the nut in the retrograde or loosening direction is prevented by reason of engagement of the nut with a portion of the locking element.

While a number of different forms of the invention are herein shown and described, it is to be understood that the invention is not limited to these forms and that it may be embodied in any form which rightfully falls within the purvey of the appended claims.

What is claimed is:

1. A nut lock, including a nut having a recess in one face, said recess having an inclined inner face, a locking element of greater thickness than the depth of the recess, and adapted to be received therein, said locking element having a tapered inner face adapted for engagement with the tapering inner face of the recess, a spring finger projecting from said locking element and adapted to engage one of the walls of said recess and said locking element having a roughened inner periphery and a roughened face opposite its tapering face adapted to engage the bolt and the part against which it is forced respectively.

2. A combined nut and bolt lock comprising a threaded bolt, a recessed nut, the recess of which has an annular straight wall and an annular inclined wall, a split resilient washer adapted to surround said bolt, a plurality of biting teeth upon the inner face of said washer, said teeth being adapted to engage the bolt to prevent turning thereof relative to said washer, a plurality of biting teeth formed on one edge of the washer and adapted to engage one of the elements to be secured together by the bolt to prevent turning of the washer relative to said element engaged thereby, and thereby prevent turning movement of the bolt relative to the elements secured together thereby, an angular face formed on one edge of said washer for engagement with the angular wall of the recess of the nut to contract the same into gripping engagement with the bolt, and a tongue projecting from said split washer and having engagement with the straight wall of the recess of the nut to prevent turning of the nut relative to the washer, said tongue being resilient in one direction of turning only of the nut.

Signed at New York, New York, this 29th day of October 1925.

JACOB G. ELKIN.